M. RICH.
Side-Hill Plow.
No. 653.
Patented Mar. 24, 1838.
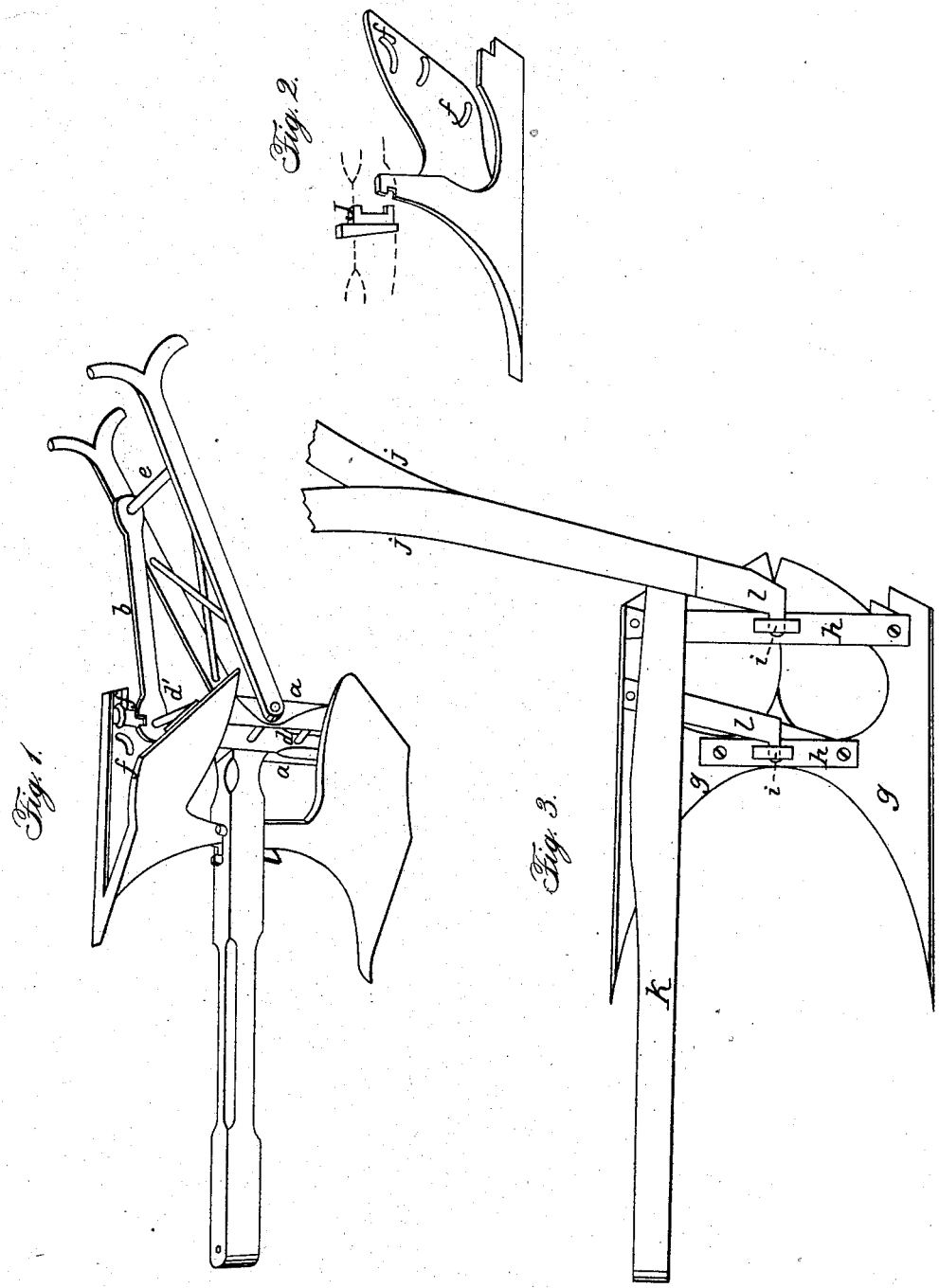

UNITED STATES PATENT OFFICE.

MARTIN RICH, OF ITHACA, NEW YORK.

IMPROVEMENT IN THE MODE OF CONSTRUCTING A DOUBLE HILLSIDE-PLOW AND CONVERTING THE SAME INTO TWO SINGLE PLOWS.

Specification forming part of Letters Patent No. 653, dated March 24, 1838.

*To all whom it may concern:*

Be it known that I, MARTIN RICH, of Ithaca, in the county of Tompkins and State of New York, have invented certain Improvements in the Manner of Constructing Hillside-Plows; and I do hereby declare that the following is a full and exact description thereof.

This hillside-plow is of the kind which has two perfect mold-boards and landsides connected together by their upper sides or standards, and which are to be inverted in alternately passing backward and forward in the act of plowing; but they are so constructed that they may be readily separated, leaving a perfect single plow, and forming a second by attaching the removed portion to another beam and handles prepared to receive it.

Figure 1 in the accompanying drawings represents the double hillside-plow, the mode of operating which does not require any description, being well known. I have, however, devised a more simple and easy manner of shifting the handles when the plow is reversed than any hitherto known. The handles work upon a round or pin in the uprights *a a*, into one of which also the beam is mortised or otherwise secured. *b* is an arm, through one end of which the round *c* of the handles pass, the other end or head having two notches in it, one on each side, which, by simply falling and catching upon the rounds *d d'* upon reversing the plow, holds the handles in the position required.

The two plow-bodies are held together within a mortise in the beam by means of a staple, *e*, Fig. 2, the two projecting ends of which pass into two notches, one on the tenon part of each standard, where they are retained by a wedge, as will be readily understood from the drawings.

When this double plow is not wanted to be used I convert it into two plows by simply taking off one of the bodies and attach it to a separate wooding prepared for the purpose, an operation which may be performed in a few minutes. The shifting-body is cast with suitable staples or loops, *f f*, to receive the handles or the uprights *a a*, as the case may be. A staple similar to that which holds the two standards together in the double is used in confining the single plow, one projection falling into the notch in the standard, and the other catching onto a jog formed in the mortise in the beam for that purpose.

Instead of constructing the handles of my double hillside-plow, so as to reverse in the manner above described, I sometimes arrange them and obtain the reversing motion, as shown in Fig. 3, where *g g* are the two landsides, and *h h* two metallic straps screwed onto each landside and furnished with eyes *i i*, forming sockets for the joint-pins of the handles *j j*, and the beam *k*, to which they are attached by joint-straps *l l*. It will be seen that by this arrangement the handles and beam are readily reversed, a simple latch serving to hold it in its place, and allowing it to be instantaneously disengaged.

Having thus described the manner in which I construct my double or hillside plow, and the manner in which I convert the same, when desired, into two separate plows, I do hereby declare that all I claim as new and of my invention is—

The manner of holding and securing the shifting-handles by means of the arm, the manner of confining the two standards in the beam by means of a staple and wedge, as described, and [the converting the double into two single plows, as described.

MARTIN RICH.

Witnesses:
G. T. WILLIAMS,
LINTON THORN.